United States Patent
Recouly et al.

(10) Patent No.: US 6,788,957 B1
(45) Date of Patent: Sep. 7, 2004

(54) TWO-BAND TRANSMITTER-RECEIVER WITH DUAL RADIATION DEVICE

(75) Inventors: Marc Recouly, Lierville (FR); Fernando Romao, Montessor (FR); Karim Ramsi, Eragny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/404,129

(22) Filed: Sep. 23, 1999

(30) Foreign Application Priority Data

Sep. 23, 1998 (FR) .......................................... 98 12062

(51) Int. Cl.$^7$ ................................................ H04M 1/00
(52) U.S. Cl. ................... 455/552.1; 455/83; 455/277.1
(58) Field of Search ........................... 455/83, 78, 101, 455/24, 25, 15, 67.1, 553, 272, 277.1, 278.1, 280, 552.1, 127.4, 193.1, 890, 575.7, 290

(56) References Cited

U.S. PATENT DOCUMENTS

| | | | | |
|---|---|---|---|---|
| 3,577,147 A | * | 5/1971 | Hannan ...................... 343/778 |
| 4,004,257 A | * | 1/1977 | Geissler ...................... 333/207 |
| 4,980,660 A | * | 12/1990 | Nakamura et al. .......... 333/101 |
| 5,015,973 A | * | 5/1991 | Kawakami et al. ......... 333/132 |
| 5,276,914 A | * | 1/1994 | Ishizuka et al. ............. 455/83 |
| 5,715,525 A | * | 2/1998 | Tarusawa et al. ........... 455/101 |
| 5,768,691 A | * | 6/1998 | Matero et al. ................ 455/78 |
| 5,794,159 A | * | 8/1998 | Portin ......................... 455/553 |
| 5,809,405 A | | 9/1998 | Yamaura ..................... 455/101 |
| 5,815,804 A | * | 9/1998 | Newell et al. ................ 455/78 |
| 5,896,562 A | * | 4/1999 | Heinonen .................... 455/76 |
| 5,915,212 A | * | 6/1999 | Przelomiec et al. ......... 455/83 |
| 6,088,570 A | * | 7/2000 | Komara et al. ............ 455/11.1 |
| 6,125,109 A | * | 9/2000 | Fuerter ....................... 370/315 |
| 6,128,476 A | * | 10/2000 | Fujita .......................... 455/101 |
| 6,215,988 B1 | * | 4/2001 | Matero ..................... 455/188.1 |
| 6,381,446 B1 | * | 4/2002 | Meixner ...................... 445/82 |
| 6,522,895 B1 | * | 2/2003 | Montalvo ................... 455/553 |

FOREIGN PATENT DOCUMENTS

| | | |
|---|---|---|
| DE | 197 04 151 | 8/1998 |
| EP | 0 823 790 | 2/1998 |

* cited by examiner

*Primary Examiner*—Charles Craver
(74) *Attorney, Agent, or Firm*—Patterson, Thuente, Skaar & Christensen, P.A.

(57) ABSTRACT

To enable a use of a two-band type mobile telephone with a dual radiation circuit, a selector switch is placed between this dual radiation circuit and transmission channels in each of these bands. Given the emergence of the second harmonic resulting from the presence of the selector switch, the undesirable components are filtered with a filter. A part of the reactive components of this filter is between the radiating circuit and the selector switch, while the other part is in the channel to be filtered. Depending on the nature of the channel, the other part in the channel to be filtered has different values.

19 Claims, 1 Drawing Sheet

TWO-BAND TRANSMITTER-RECEIVER WITH DUAL RADIATION DEVICE

BACKGROUND OF THE INVENTION

1. Field of the Invention

An object of the invention is a two-band transmitter/receiver with a dual radiation device. It can be applied more particularly in the field of mobile telephones. In this field, the transmitters/receivers concerned are quite simply mobile telephones that are transmitters/receivers and are two-band devices at least because they are capable of adapting to one standard or another (or even to a third or fourth standard). The standards concerned are especially the so-called GSM standard where the transmission/reception operations are carried out in a 900 MHz band, the DCS standard where the transmissions/reception operations are carried out in the 1800 MHz band, the PCS standard where they are carried out in a 1900 MHz band, or again the UMTS standard where they are carried out in the 2200 MHz band.

The invention is essentially useful when instruments of this kind are provided with two means of radiation. For this purpose, there is a known first means of radiation which is the antenna of a mobile telephone. However, these mobile telephones are in most cases provided in their socket with a connector capable of broadcasting transmissions (and also being used for reception) by being connected to an aerial other than that of the mobile telephone, for example that of a vehicle in which this mobile telephone is placed.

2. Description of the Prior Art

The problems encountered in this type of equipment lie chiefly in an antenna selector switch used to broadcast the power radiated in transmission either in the antenna proper of the mobile telephone or by means of the socket connector of this mobile telephone in an external aerial. Indeed, these antenna selector switches are made up of integrated circuits, especially MOS type transistor circuits. These MOS transistors, depending on whether they are on or off, let through power to be broadcast to one aerial or another.

It can furthermore be seen that the power values to be dissipated vary from one standard to another. Indeed, these power values are related to the conditions of propagation, according to the frequency ranges. Thus, it is accepted that, according to the GSM standard, it is possible to transmit to two watts of radioelectric energy. By contrast, in the DCS and PCS standards as well as in the UMTS standards, the transmission power is limited to one watt.

Just as the passage from a power value of one watt through the transistors constituting the output selector switches does not raise any particular difficulty, so it can seen that a power value of two watts is greater than a borderline power of linear operation of the currently available selector switch transistors. These selector switch transistors then work in a non-linear zone. More specifically, the selection switching leads to a class B operation of these transistors. Under these conditions, these transistors distort the transmitted signals. The chief consequence of this is the sending of a second harmonic of the fundamental transmission frequency.

A second harmonic such as this has a first drawback: that of dispensing power unnecessarily since it will not be picked up. It furthermore has a second drawback that is far more troublesome: it forms a source of uncontrollable parasites in the bands of frequencies higher than that of the base signal. In practice, it is assumed that a GSM-DCS type output selector switch is a source of noise that causes trouble for the DCS, PCS or UMTS type networks. Naturally, the same phenomena of distortion occur for the latter networks, when the output selector switch permits transmission according to the last-named standards. However, the problem then is less troublesome firstly because the power emitted is then weaker and secondly because, to date, there are no users at frequencies twice the nominal frequencies of the last-named three ranges.

A simple solution used to resolve this problem could consist in setting up a filter at output of the selector switch. The aim of this filter would be to dampen the second harmonics emitted in a range. The presence of a filter of this kind would unfortunately be unacceptable because it would ipso facto attenuate transmission and reception in the other three ranges. Otherwise, it may be planned to make this filter itself switchable. However, this brings us back to the previous problem where the selector switch of this filter would itself induce parasites by distortion whose effects cannot be undone.

In GSM, DCS, PCS or other types of telephony, the instruments used are not duplex instruments. In fact, they are either transmitters or receivers in alternation. There are several transmission systems. These include the systems known as TDMA (time division multiple access), FDMA (frequency division multiple access), CDMA (coded division multiple access) or and combined systems using these three systems. The TDMA system works by time division while the other two systems work by the sharing of a frequency plane or a encoding system. However in these three systems, the machines are either in transmission mode or in reception mode: there are never in both modes at the same time. There is therefore an automatic alternation managed by a microprocessor of the mobile telephone that works according to instructions given to it by a base station and according to a desired protocol. According to this protocol, transmission phases follow reception phases in alternation, whether the phases are continuous in time or sporadic. The duplexer function thus achieved is then also obtained in the form of an alternating selector switch.

In two-band machines (especially GSM-DCS machines), finally there is a third type of selector switching: a band selector switch or a mode selector switch to go from one standard to the other.

There is no known total selector switch function. Given the complexity of the three types of cascaded selector switching functions, namely the antenna selector switch, the alternation selector switch and the mode selector switch, it has been discovered in the invention that it is simpler to place the antenna selector switch down-line with respect to the assembly. The number of transistors used for the total selector switch is then reduced to its minimum. This leads to a second harmonic rate that is as low as possible.

SUMMARY OF THE INVENTION

Thus, an object of the invention is a transmission/reception circuit comprising:

a first pair of reception channels respectively tuned to a frequency f0 and to a frequency f1 different from f0 and connected to two inputs of a first diplexer, a second pair of transmission channels respectively tuned to a frequency f0 and a frequency f1 and connected to two inputs of a second diplexer, a first and second radiation circuit, and a selector switch connected at input to the outputs of the two diplexers and at output to the two radiation circuits, to receive these two channels and switch over a transmission channel and a reception channel tuned to one and the same frequency on one of the radiation circuits.

Furthermore, in the transmission phases, which are the most critical from the viewpoint of the transmission of the second harmonic, to prevent the propagation of a second harmonic such as this, especially in the case of a GSM type use (in order not to create parasites in the DCS, PCS and UMTS bands), it is planned in the invention to obtain a non-switched filter. In the invention, the components of this non-switched filter are located partly after and partly before the mode selector switch. In a preferred variant, these components are placed on either side of the general selector switch. Thus, the reactive impedance part located before this selector switch gets combined with another reactive impedance part located before this selector switch on a transmission channel to attenuate the second harmonic.

When the use is switched to another mode, the signal sent no longer perceives anything on its path other than one of these two reactive impedance parts, the one located after the mode selector switch. Indeed, in the transmission on this other channel, there is no other reactive impedance or an impedance at a different value. Thus, this other signal is not dampened and can get freely propagated. This was the goal to be achieved.

It is also an object of the invention therefore to obtain a transmission circuit comprising a transmission channel for a carrier at a frequency f0, a transmission channel for a carrier at a frequency f1 different from f0, a radiation circuit and a selector switch to receive these two transmission channels and switch over one of these two transmission channels to the radiation circuit, wherein the transmission circuit comprises a first filter element located between the selector switch and the radiation circuit, this first filter element being tuned to a second filter element located in the transmission channel at the frequency f0 to prevent the transmission, through this frequency channel at the frequency f0, of frequency components at the frequency f1.

BRIEF DESCRIPTION OF THE DRAWING

The invention will be understood more clearly from the following description made with reference to the appended figure. This

FIG. 1 shows a transmission circuit that can also be used in transmission/reception and comprises the means of the invention.

MORE DETAILED DESCRIPTION

Figure 1:
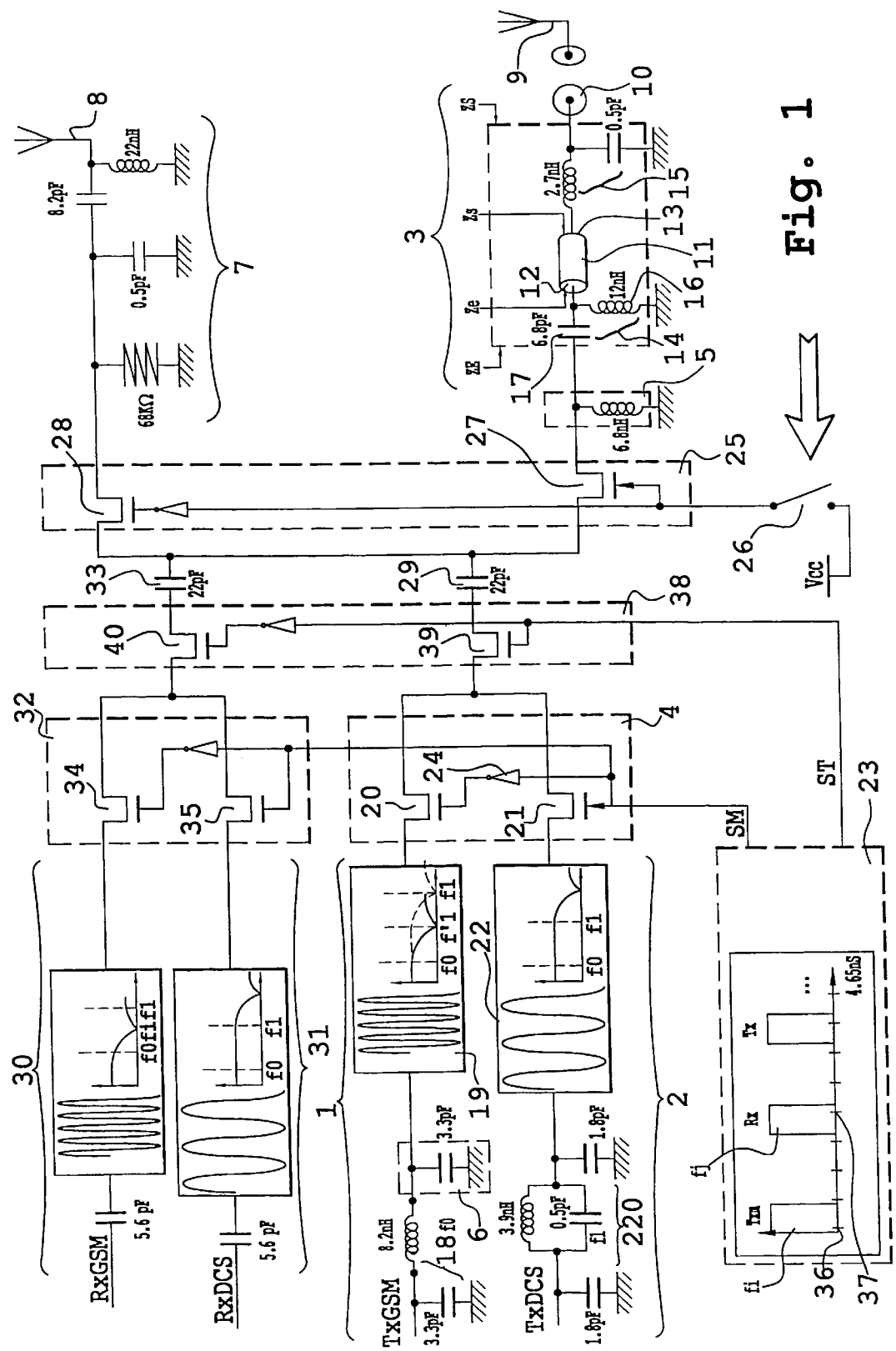
FIG. 1 is given purely by way of an indication and in no way restricts the scope of the invention.

FIG. 1 gives a view according to the invention of a transmission circuit comprising a first transmission channel 1 to send a signal at a carrier frequency f0 and a second transmission channel 2 to send a signal at a carrier frequency f1. FIG. 1 also shows a radiation circuit 3 and a selector switch 4 to receive the two transmission channels at input and to switch over one of these two transmission channels to the radiation circuit 3. The selector switch 4 is a mode selector switch called also a diplexer. A first mode enables the sending of a carrier f0 according to the GSM standard. A second mode enables the sending of a carrier f1 according to the DCS standard (or PCS or UMTS standard) such that f1 is about twice f0.

The invention is characterized more particularly in that a first filter element 5 is cascade-connected between the selector switch 4 and the radiation circuit 3. The filter element 5 is tuned with a second filter element 6. The filter element 6 is located in the transmission channel 1 at the frequency f0 up-line from the switch 4. The tuning of the elements 5 and 6 is set to prevent transmission by the channel 1 of the frequency components at the frequency f1, namely the carrier frequency of the transmission channel 2.

This circuit works as follows. When the selector switch 4 selects the channel 1 to link it with the radiation circuit 3, the cascade-connected elements 5 and 6 come into action in a filter to prevent the transmission by the radiation device 3 of components at a frequency f1. When the selector switch 4 puts the transmission channel 2 into operation, the filter element 5 cooperates with filter elements of this channel 2 which, however, are mismatched from this viewpoint and do not prevent transmission through the channel 2, on the radiation circuit 3, of frequency components at the frequency f1.

FIG. 1 shows several radiating circuits: the circuits 3 and 7. In one example, the circuit 7 is the normal antenna circuit of a mobile telephone with an antenna 8. In this same example, the radiating circuit 3 has an aerial 9 of a vehicle that gets connected to a socket connector 10 of the mobile telephone. A mobile telephone has a certain length. In general, this length is about 15 centimeters. For reasons of shielding, the transmission circuits, especially an output power amplifier, are located near the normal aerial 8 of the mobile telephone. Since this aerial 8 is generally located towards the top of the mobile telephone, the transmitted signal must be conducted up to the connector 10 of the socket connector. This is achieved inside the mobile telephone by an coaxial cable element 11 with a length of the same order as the length of the mobile telephone.

For reasons of impedance matching, it is possible to provide the input 12 and the output 13 of this coaxial cable 11 with impedance matching circuits to prevent reflections in the aerial 9. For example, an input circuit 14 and an output circuit 15 make it possible to ensure that the impedance value Ze at the input and Zs at output are matched with impedances ZE and ZS at input and output of the radiation circuit 3. For practical reasons, especially so that Ze and Zs are matched at 50 ohms, the circuits 14 and 15 each have, in one example, a capacitor and an inductor mounted as shown in FIG. 1 with values indicated therein.

In the example shown, the first filter element 5 is an inductor parallel-connected between the output of the selector switch 4 and the ground. It is designed to resonate with a capacitor 6 parallel-connected between the input of the selector switch 4 and the ground. This resonance prevents the transmission of frequency components at the frequency f1. Of course, on the one hand, the parallel-connected inductor 5 and capacitor 6 could be different components, mounted differently, while having the same rejection goal. Secondly, the matching impedance values of the circuits 14 and 15, the latter being reduced to the input 12 of the coaxial cable 11, may contribute with the impedance 5 to defining the desired rejection frequency. The values indicated for the circuits 14 and 15 are wideband matching values: their effect herein is limited to the wideband matching of the coaxial cable 11. However, it would be possible to modify one of the elements of the circuit 14, for example an inductor 16 or a capacitor 17 so that, in the place of or as a complement to the reactive impedance 5 and in cooperation with the reactive impedance 6, it contributes to bringing about the desired rejection.

Similarly, the capacitor 6 also works together with an input filter 18 located in the transmission channel 1 at the output of a power amplifier (not shown). Consequently, the second filter element with which the first filter element 5 is tuned may also comprise several reactive components.

A filter mounted at output of the power amplifier, in the transmission channel at the frequency f0, should not be capable of letting through components at the frequency f1. Independently of the switching problem, this filter is, in most cases, made in the form of a surface wave filter 19. This filter 19 is therefore symbolically represented by a set of meanders. The making of these meanders on a printed circuit has the effect, in the case of a rejection filter, of preventing the propagation of an undesirable component by means of a reverse surface wave. Here for example the undesirable component is a component at a frequency f1. This is why the passband of the filter 19 is shown with a rejection frequency at the frequency f1.

Normally the filter 19 therefore prevents the propagation of the undesirable modes of the frequency f1 in the range of F0 or twice f0. According to the invention, the filter element 5 must cooperate with the element 6, especially at the frequency f1, to constitute a rejection filter at the frequency f1. Thus, the rejection frequency of the filter 19 is preferably shifted to an intermediate frequency f1 between the frequency f0 and the frequency f1. In this way, the phenomenon of cooperation of the reactive elements 5 and 6 can take place. In one example, the filter 19 made will have a rejection frequency f1' in the range of 1.4 times f0. This will make the filter 19 possibly less of a rejection filter for the components at f1 since it is essentially computed for the components at f1'. On the contrary, it will let through waves at the frequency f1 so that the filter elements 6 (or 18) can cooperate with the filter element 5 (or 14, 15).

The switch 4 is made in the form of two parallel-connected switches. A switch comprises a first transistor 20 (or an equivalent) to permit the transmission of the signals available in the transmission channel 1. The depiction shows, for this switch, in a schematic way, an N type transistor 20 receiving a control signal at its gate. In fact, this switch 20 is made with an N transistor and a P transistor parallel-connected with each other and receiving complementary signals at their gates to permit the transmission of alternating analog signals. The switch 4 furthermore comprises a second transistor 21 (or an equivalent) to permit the transmission of the signals sent in the transmission channel 2.

The transmission channel 2 for its part has a filter 22, similar to the filter 19, for which the rejection frequency is located beyond the frequency f1. Indeed, the filter 22 is supposed to let through the signals at this frequency f1 but must stop the signals at a frequency twice f1 and above. The surface wave filter 22 comprises up-line reactive elements 220 similar to the elements 6 and 18. These reactive elements are designed to get combined with the impedance 5 so as to help the components to be let through at the frequency f1 more efficiently.

The transistors 20 and 21 are controlled by a mode signal SM produced by a control circuit 23 whose operation shall be seen further below. The control signals of the transistors 20 and 21 undergoes a reversal between the transistor 20 control signal and the transistor 21 control signal by means of an inverter 24 in particular. Consequently, with a single signal, either the transmission channel 1 or the transmission channel 2 is turned on.

The channel that is turned on is then preferably connected to a selection circuit 25 before being linked with the radiating circuit 3 of the radiating circuit 7. The selection circuit 25 is therefore an antenna selector switch. Its purpose is to choose a radiating circuit corresponding to one use rather than another. In a known way, the connection of the aerial 9 in the connector 10 prompts the closing or opening of the switch 26 enabling a change in the polarity of a selection signal applied to interrupter transistors 27 and 28 (or the like) of the selection circuit 25. The selection signal too undergoes a reversal between the control of the transistor 27 and that of the transistor 28. The simple fact of prompting the connection thus activates an end-of-travel detector. Thus, through the switch 4 and the switch 25, a transmission channel is connected to the circuit 3 or circuit 7. Given the problems of bias that may occur at different parts of the circuit, the switch 4 will be connected to the circuit 25 by means of a decoupling capacitor 29.

As a counterpart to the transmission circuits 1 and 2, in relation with the radiating circuits 3 or 7, a transmitter/receiver according to the invention also comprises two reception channels 30 and 31 tuned to f0 and f1 respectively. In one example, the channel 30 at f0 is a reception channel working under the GSM standard while the channel 31 is a reception channel under the DCS standard. The linking of either of these channels with either of the transmission circuits 3 and 7 is done through a switch 32 which too plays the role of a diplexer and has a function identical to that of the selector switch 4. The selector switch 32 has two inputs and one output. One input is connected to the channel 30, the other to the channel 31. The output of the selector switch 32 is connected to the single input of the selector switch 25 by means of a decoupling capacitor 33. Like the selector switch 4, the selector switch 32 has two switch transistors 34 and 35 cascade-connected respectively with one of the channels 30 and 31 and also with the capacitor 33. These transistors 34 and 35 (or their equivalent) are also controlled by the control signal SM coming from the control circuit 23.

The control circuit 23 is capable of taking account of information laid down by a user at the keyboard of the mobile telephone or by a removable circuit inserted into this telephone to switch it from one mode according to one standard to one mode according to another standard. The control signal sent for this purpose by the circuit 23 therefore accordingly activates simultaneously the switch 4 and the switch 32.

As indicated here above, whatever the modes of operation chosen (TDMA, FDMA, CDMA or combined), the mobile telephones are not true duplex instruments but work rather with automatic alternation. In the circuit of FIG. 23, a distribution is shown, in the context of TDMA type use, of temporal windows 36 and 37 respectively in transmission and reception. According to the GSM standard, temporal windows of 577 microseconds each must be separated by two temporal windows, allocated possibly to other users in one and the same frame of 4.65 milliseconds. In the windows 36 and 37, the exchange frequencies are respectively fi and fj. These frequencies fi and fj belong, as the case may be, to the f0 band or the f1 band.

To obtain alternation, the total switch comprises an alternating switch 38 with two switched transistors 39 and 40 (or the like) series-connected at the outputs of the selector switches 4 and 32 respectively and series-connected by the capacitors 29 and 33 to the single input of the antenna selector switch 25.

The circuit 23 then produces a control signal ST for the control of the selector switch 38 at the rate of the windows 36 and 37 to drive the control gates of the transistors 39 and 40 of the circuit 38. The circuit 38 is thus cascade-connected between the selector switches 4 and 32 and the selector switch 25. Depending on the value of the temporal signal ST delivered by the circuit 23, either of the transistors 39 or 40 will be turned on so as to connect a transmission channel 1 or 2 or a reception channel 30 or 31 to a radiating circuit 3 or 7.

From the viewpoint of the invention, the selector switches 4, 23 and 25 are equivalent in that they have selector switch functions. However, in any case of selector switching, it is noted that a cascade connection of three series-connected switch transistors is present. For example, for the radiating circuit 3 and for the transmission channel 1, these are the transistors 27, 39 and 20. For the transmission channel 2, these are the transistors 27, 39 and 21. For reception, the transistor 39 is replaced by the transistor 40 and the transistors 20 and 21 are replaced by the transistors 34 and 35 respectively. Thus, there is a great likelihood that the distortion phenomenon referred to here above will occur, in view of the number of transistors that are capable of causing it. However, this phenomenon is reduced with the architecture of the invention where only three switches are series-connected.

Filters have been shown for the transmission channel 1, especially with the components 18, 6 and 5. However, in the reception channels 30 and 31, there is no need to have such filters since in reception there is no transmission of parasites on the RF network to be feared. At most, decoupling capacitors will be series-connected in the reception channel of the signal. Just as the filter element 5 has been planned on the radiating circuit 3, a similar structure may be planned for the circuit 7.

What is claimed is:

1. A transmission circuit comprising a transmission channel for a carrier at a frequency f0, a transmission channel for a carrier at a frequency of f1 different from f0, a radiation circuit and a single selector switch to receive these two transmission channels and switch over one of these two transmission channels to the radiation circuit, wherein the transmission circuit comprises a single first filter element located between the selector switch and the radiation circuit, this first filter element being tuned to a second filter element located in the transmission channel at the frequency f0 to prevent the transmission, through this transmission channel at the frequency f0, of frequency components at the frequency f1, and the first filter element is tuned with a third filter element located in the transmission channel at the frequency f1 to enable the transmission, by this transmission channel at the frequency f1, of frequency components at the frequency f1.

2. A circuit according to claim 1, wherein the first filter element is an inductor parallel-connected between an output of the selector switch and the ground.

3. A circuit according to claim 1, wherein the first filter element and the second filter element form a rejector filter for signals whose frequency is between f0 and f1.

4. A circuit according to claim 3, wherein the rejection frequency is about 1.4 times f0.

5. A circuit according to claim 1, comprising two radiating circuits.

6. A transmission/reception comprising:
a first pair of reception channels respectively tuned to a frequency f0 and to a frequency f1, different from f0,
a second pair of transmission channnles respectively tuned to the frequency f0 and to the frequency f1,
a first and a second radiation circuit,
a first and a second diplexer,
and a selector switch connected at input to the outputs of the two diplexers and at output to the two radiation circuits, to receive these two pairs of channels and switch over a transmission channel and a reception channel tuned to one and the same frequency on one of the radiation circuits, wherein:
the first pair of reception channels is connected to two inputs of the first diplexer,
the second pair of transmission channels are connected to two inputs of the second diplexer,
the transmission/reception circuit comprises a single first filter element located between the selector switch and one of the radiation circuits, this first filter element being tuned with a second filter element located in the transmission channel at the frequency f0 to prevent the transmission by this transmission channel at the frequency f0, of frequency components at the frequency f1, and
the first filter element is tuned with a third filter element located in the transmission channel at the frequency f1 to enable the transmission, by this transmission channel at the frequency f1, of frequency components at the frequency f1.

7. A circuit according to claim 6, wherein the first element is an inductor parallel-connected between an output of the selector switch and the ground.

8. A circuit according to claim 6, wherein the first element and the second element forr a rejector filter for signals whose frequency is between f0 and f1.

9. A circuit according to claim 8, wherein the rejection frequency is about 1.4 times f0.

10. A circuit according to claim 6, comprising, in cascade, a pair of mode selector switches, an alternating selector switch and an antenna selector switch.

11. A circuit according to claim 6, comprising two radiating circuits.

12. A transmission circuit comprising a transmission channel for a carrier at a frequency f0, a transmission channel for a carrier at a frequency of f1 different from f0, a radiation circuit and a selector switch to receive these two transmission channels and switch over one of these two transmission channels to the radiation circuit, wherein the transmission circuit comprises a first filter element located between the selector switch and the radiation circuit, this first filter element being tuned to a second filter element located in the transmission channel at the frequency f0 to prevent the transmission, through this transmission channel at the frequency f0, of frequency components at the frequency f1, wherein the first filter element is tuned with a third filter element located in the transmission channel at the frequency f1 to enable the transmission, by this transmission channel at the frequency f1, of frequency components at the frequency f1.

13. A transmission circuit comprising a transmission channel for a carrer at a frequency f0, a transmission channel for a carrier at a frequency of f1 different from f0, a radiation circuit and a selector switch to receive these two transmission channels and switch over one of these two transmission channels to the radiation circuit, wherein the transmission circuit comprises a first filter element located between the selector switch and the radiation circuit, this first filter element being tuned to a second filter element located in the transmission channel at the frequency f0 to prevent the transmission, through this transmission channel at the frequency f0, of frequency components at the frequency f1, and including, in cascade, a pair of node selector switches, an alternating selector switch and an antenna selector switch.

14. A transmission/reception circuit comprising:
a first pair of reception channels respectively tuned to a frequency f0 and to a frequency f1, different from f0,
a second pair of transmission channels respectively tuned to the frequency f0 and to the frequency f1,
a first and a second radiation circuit,
a first and a second diplexer,
in cascade, a pair of mode selector switches, an alternating selector switch and an antenna selector switch,
and a selector switch connected at input to the outputs of the two diplexers and at output to the two radiation circuits, to receive these two pairs of channels and switch over a transmission channel and a reception channel tuned to one and the same frequency on one of the radiation circuits, wherein:
the first pair of reception channels is connected to two inputs of the first diplexer, the second pair of transmission channels are connected to two inputs of the second diplexer, and
the transmnission/reception circuit comprises a single first filter element located between the selector switch and one of the radiation circuits, this first filter element being tuned with a second filter element located in the transmission channel at the frequency f0 to prevent the transmission, by this transmission channel at the frequency f0, of frequency components at the frequency f1.

15. A circuit according to claim 14, wherein the first element is an inductor parallel-connected between an output of the selector switch and the ground.

16. A circuit according to claim 14, wherein the first element and the second element form a rejector filter for signals whose frequency is between f0 and f1.

17. A circuit according to claim 16, wherein the rejection frequency is about 1.4 times f0.

18. A circuit according to claim 14, comprising two radiating circuits.

19. A circuit according to claim 14, wherein the first filter element is tuned with a third filter element located in the transmission channel at the frequency f1 to enable the transmission, by this transmission channel at the frequency f1, of frequency components at the frequency f1.

* * * * *